July 12, 1966 E. B. HEDGEPETH 3,260,929
SUPPORT FRAME STRUCTURE FOR VEHICLES
Filed Nov. 6, 1963
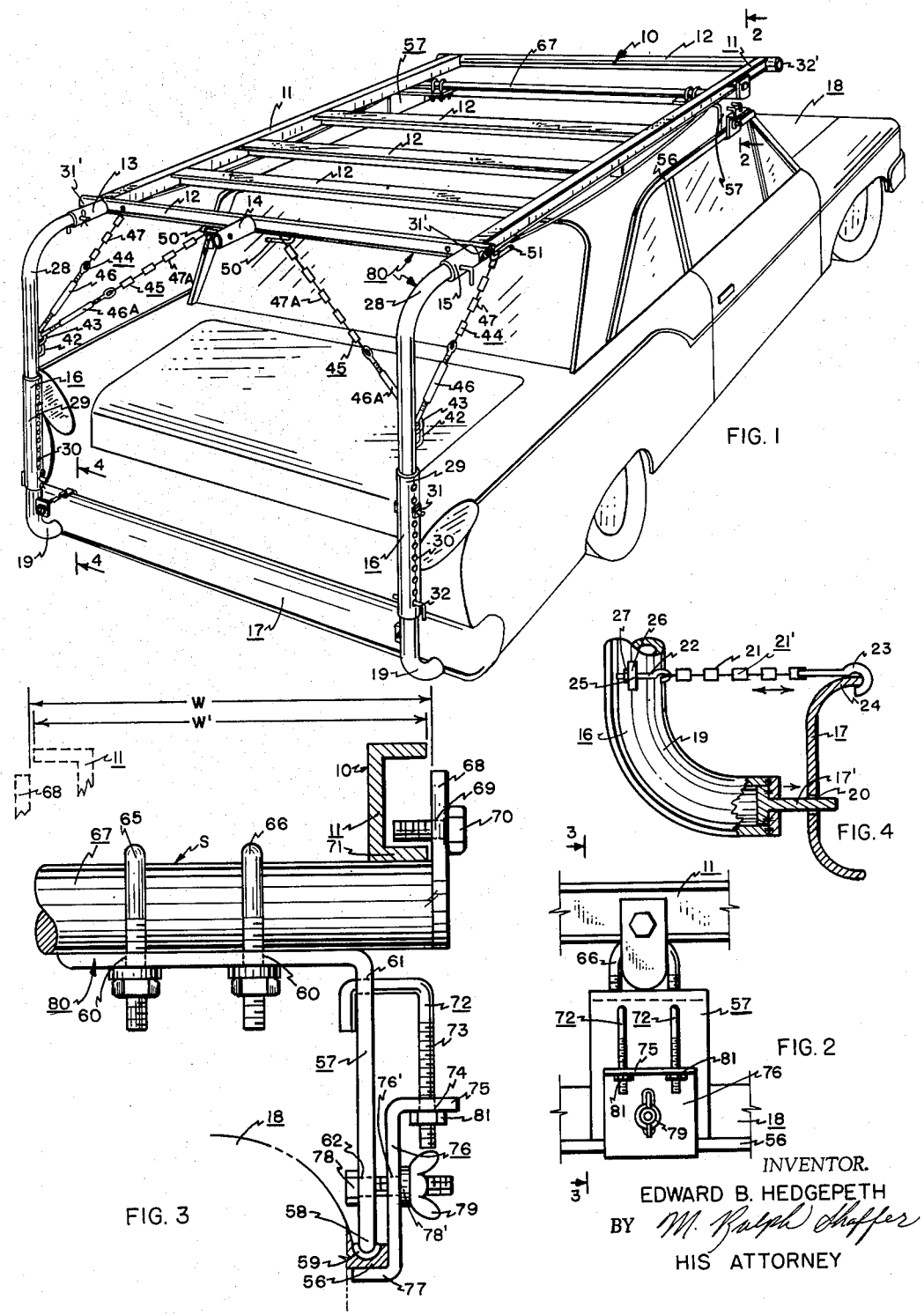
INVENTOR.
EDWARD B. HEDGEPETH
BY M. Ralph Shaffer
HIS ATTORNEY

United States Patent Office 3,260,929
Patented July 12, 1966

3,260,929
SUPPORT FRAME STRUCTURE FOR VEHICLES
Edward B. Hedgepeth, 432 East 27th South St., Apt. 38, Salt Lake City, Utah
Filed Nov. 6, 1963, Ser. No. 321,880
2 Claims. (Cl. 224—42.07)

The present invention relates to support structures for vehicles and, more particularly, to new and improved support structures and support frames which may be carried by vehicles in a unique manner so that reliability and maximum load-carrying capacity are assured without chancing damage to the vehicle carrying the same.

Accordingly, a principle object of the present invention is to provide a new and improved support frame and support structure therefor for carriage by vehicles such as automobiles.

Another object of the invention is to provide a support frame construction which is easily mounted to and supported by the rear bumper and the drain strips of a vehicle, this in a manner such as not to damage or disfigure the rear bumper and to accommodate drain strip support such that stress loading thereon is avoided, and this regardless of the movement of the automobile.

A further object of the invention is to provide a bearing support structure, easily attachable to the drain strips of an automobile, which allows for the longitudinal and/or lateral slideable movement thereover of the support frame supported thereby, thereby insuring that the loading of the drain strips is reduced to a minimum.

A further object is to provide tensioning brace means at support frame, support structure junctures, and also at junctures of the rear bumper of a vehicle with the support structure ancillary to the support frame, wherein rigidity is assured as to the manner in which the support frame is carried above the vehicle.

A further object is to provide improved drain strip clamping means for overhead support frames and carriers.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view, partially broken away and sectioned, of a support frame and associated structure fabricated according to the present invention, mounted to and carried by a towing vehicle.

FIGURE 2 is an enlarged, fragmentary view taken along the line 2—2 in FIGURE 1, and is a side elevation of the structure here intended to be shown.

FIGURE 3 is an enlarged, fragmentary, partially-sectioned view taken along the line 3—3 in FIGURE 2; for convenience of illustration the outline of the towing vehicle is shown in phantom lines.

FIGURE 4 is an enlarged, fragmentary, partially-sectioned view taken along the line 4—4 in FIGURE 1, illustrating representative structure and manner by which the support frame is secured to and carried by the rear bumper of the towing vehicle.

In FIGURE 1 support frame 10 is shown to include a pair of longitudinal channel members 11 and plural, mutually spaced, cross-members 12 which span and are secured to the former by welding or other suitable means. Support frame 10, as shown, is provided with rearwardly extending, tubular, stub receptacles 13, 14, and 15, the former and latter of which are adapted to receive respective, disassembleable, rear upright means 16 which are respectively, releasably affixed to the rear bumper 17 of vehicle 18 and also to and within receptacles 13 and 15. Respective means 16 are for the purpose of supporting the load of support frame 10, and any load which it carries, at the rearward extremities of support frame 10. The means 16, so far as their respective assemblies are concerned, are substantially identical to those disclosed in the inventor's co-pending application, Serial No. 188,742, filed April 19, 1962, now Patent 3,160,434 and entitled "Collapsible Cabin and Accommodating Support Structure for Automobiles," save for certain important exceptions. These exceptions include the provision of a welded, fixed stub finger 17' at the base of bumper mounting member 19, which finger 17' protrudes through aperture 20 of rear bumper 17. The bumper mounting member 19 is securely retained to and against the bumper 17 by means of the provision of intercoupled chain 21, and retainer hook 23, the latter hooking over the upper lip 24 of bumper 17, and the hook 22 of the tensioning means passing through aperture 25 of ear 26 and being retained by nut 27 against fixed ear 26 welded or otherwise secured to bumper mounting 19. Accordingly, the tightening down of nut 27 upon the threaded hook 22 cinches up the connection comprising retaining hook 23, chain 21, and hook 22 so as to insure securement of each bumper mounting member 19 and, hence, of each means 16, to the rear bumper 17.

As is also delineated in the inventor's co-pending application above referenced, and now fully incorporated herein by way of reference, each of the rear upright means comprises inverted-L, upstanding members 28 which are fitted into stub receptacles 13 and 15 and which at their lowest extremities telescope into respective medial sleeves 29. In a similar manner bumper mounting members 19 telescope upwardly into the medial sleeves 29, and the sleeve-retained extremities of inverted-L, upstanding members 28 and bumper mounting members 19 are line-drilled to provide apertures (not shown) selectively registerable with apertures 30 of the medial sleeves 29 so as to accommodate the telescoping pinned retention of these extremities by bolt attachments 31 and lever pin 32 to form, preferably, disassembleable, rear upright means 16. Obviously, the lever pin may be accommodated with an end retainer such as a cotter key, if desired.

The advantages of the disassembleable nature of the rear, upright, support means 16, when used, are fully described in the applicant's referenced co-pending case wherein it is taught that suitable jack means may support uprights disposed in receptacles 31' and 32' in order that all mounting attachments to the vehicle 18 may be disassembled and removed and the vehicle driven from underneath the support frame 10, left standing and supported by auxiliary jacks, not shown.

Note, also, is to be made that the upstanding members 28 each include fixed ring mounts 42 which are provided with respective tension-brace accommodating ring means 43. Respective tension braces 44 and 45 are composed of turnbuckles 46 and 46A and chain lengths 47 and 47A which are mutually engaged to the respective ring mounts 43 and associated frame retainer fingers 50 and 51 (one being shown as to the latter). It is important to note that these tension-brace means 44 and 45 supply tensioning forces to the frame and the respective disassembleable, rear upright means 16 so as to tighten rigidly the receptive means 16 and with respect to each other and, in addition, serves to strengthen the rigidity of the composite construction against inertial tendencies of the support frame and that which it carries as against sudden vehicle decelerations. On the other hand, the easily attachable and detachable elongate tension means 21', comprised of respective hook 22, chain 21, and retainer hook 23, serve to aid in keeping the structure securely held together, rigid, and intact during periods of vehicle acceleration and deceleration, this in combination with the other means about to be mentioned.

In FIGURES 2 and 3 the vehicle 18 is shown provided with a drain strip 56 disposed on respective sides of the vehicle. Respective support brackets 57 have their lower edges 58 provided with drain strip pads 59 (preferably forming a part of edges 58) which are preferably fabricated from a resilient rubber or neoprene, and which are also provided with plural apertures 60, plural apertures 61, and aperture 62. Disposed through plural apertures 60 (four being required in the embodiment shown) are U-bolts 65 and 66 which provide the secured mounting of support brackets 57 to bearing support cross-member 67. Cross-member 67 includes upstanding plates or ears 68 which are fixed in their construction and orientation. Threadedly disposed through apertures 69 in upstanding end-plates 68 are respective guide-bolts 70 which protrude inwardly and are disposed above the bottom flange 71 of each of the respective channel members 11. The upstanding ears 68 with the composite cross-member 67 are so constructed as to be slightly greater in width W than the outer width dimension W' of the channel members of support frame 10. This enables the support frame 10 to shift back and forth along the outer surface of bearing support cross-members 67 in response to turning movements of the vehicle. Forward and rearward shifts of the support frame 10 are accommodated for by the non-clamping spacing existing between guide-bolts 70 and the lower flange 71 of each of the longitudinal channel members 11.

Before discussing the operation of the structure further, it is deemed desirable to complete a description of the construction so far as its flexible securement thereof to the automobile is concerned. It is noted that inverted J-bolts 72 pass through apertures 61, and their threaded shanks 73 thereof pass through apertures 74 of outwardly extending flange 75 of the securement bracket 76. The lower flange 77 thereof passes underneath drain strip 56 as shown. In configurement, the securement bracket 76 is shown to be of a general Z-form as to vertical cross-section. Apertures 62 and 76' are, as shown in FIGURE 3, aligned and provide for the mutual securement of drain strip securement bracket 76 and support bracket 57 by means of respective bolts 78, washers 78', and wing-nuts 79. Thus, with reference to FIGURE 3, it is seen that the tightening down of nuts 81, threaded onto inverted J-bolts 73, increases the retention of the bearing support, cross-member structure and its securement to drain-strip 56 of the vehicle 18. Correspondingly, the tightening down of respective wing-nut 79 insures the fixed retentive securement of the overall composite support structure 80 for the frame 10.

In practice it is preferred that cross-member 67 be of either solid rod or of tubular construction. This insures that a minimum of surface contact will be had thereby with the channel members 11 which the same supports. Such reduces frictional wear.

It is further to be noted that when the support frame 10 is jacked up on both sides in a manner as shown in the inventor's co-pending case above referenced, then the user need merely thread outwardly both of the opposite guide-bolts 70 and, assuming that the support frame 10 is jacked high enough, then the user may simply back out his vehicle from underneath the frame construction without disturbing the support structure 80 and its securement to vehicle 18.

The structure above described operates as follows. Initially, it is to be understood that the composite support structure 80 will be preliminarily assembled and mounted to the drain strips of a vehicle 18 in the manner above described. Then the user will drive his vehicle underneath a support frame 10, previously jacked-up sufficiently to allow for clearance of the vehicle and also of the support structure 80. The support frame 10 is then jacked-down so that the longitudinal channel members 11 come to rest upon bearing support cross-member 67. At this point the disassembleable rear upright means 16 are attached to the rear stub receptacles 13 and 15 of the support frame and the support means 16 assembled and affixed to the rear bumper 17 of the vehicle in the manner above described and also detailed in the inventor's co-pending case above referenced. It will be noted at this juncture that the fingers 17' will be disposed through apertures 20 of rear bumper 17 and that the fixed securement of bumper-mounting members 19 to bumper 17 will be insured through the tightening down of the elongate tension retainer means 21 as is effected through the tightening of nuts 27. After this operation is performed tension braces 44 and 45 are tightened, after implacement, so that the overall support structure and support frame become rigid. Again, the tension braces 44 and 45, oriented in askew planes relative to support frame 10, serve to strengthen the L-junctures at inverted-L upstanding members 28, both laterally and longitudinally, tighten the disassemblable means 16 disposed at both extremities of the support frame and, in addition, serve to strengthen as among themselves the two upstanding means 16.

Again, it is the elongate tension means 21' joining bumper-mounting members 19 to bumper 17 which, in combination with the tension braces 44 and 45, keeps the over-all support structure means 16 rigid and highly versatile in accommodating slight support frame displacement pursuant to vehicle motion during travel.

As to the latter, it is seen that the bearing engagement of the support frame 10 upon bearing support cross-member 67 provides a flexible loading of the vehicle so that severe strain is not imposed upon the vehicle top and particularly at the drain strips 56. Thus, during rapid accelerations and decelerations, the slight, nominally horizontal, rearward and forward, inertial displacement of the support frame 10 as the car comes to a stop, for example, is accommodated for by bearing support cross-member 67 over which the longitudinal channel members 11 incrementally slide. This movement of members 11 is restricted suitably, however, by the provision of guide-bolts 70 and upstanding end-plates 68, the former permitting sliding translations without allowing the support frame to tip upwardly and the latter allowing for sideways displacements of a restricted nature. This effectively "loosens" the coupling between the support frame and the car so that substantially no stress is imposed upon the vehicle body at drain strip 56. Further, by the present structure the support frame 10, in effect, "floats" above the vehicle, on cross member 67, and that tension braces 44, 45, in combination with torsion effects of the support frame and upright means 16 restore the over-all structure to central position after severe inertial changes have passed.

This flexibility of the forward portion of the support structure of support frame 10 is enabled through the tension braces and tensioning means 21' toward the rear of the structure. The overall effect has been through experimentation and practice, unusually reliable and versatile, accommodating large loads to be carried by vehicles in a very secure manner and without damage or likelihood thereof to the vehicle using the same.

If desired, a grease or other lubricant may be used between channel members 11 and cross member 67, for proper lubrication.

It will be understood with reference to FIGURES 1 and 3 that securement bracket 76 may be disposed either beneath the drain strip directly or completely inside and upwardly against the door opening, in which latter event the upper edge of the door opening shall be considered the bottom of drain strip 56.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of the invention.

I claim:

1. In combination, a support frame for disposition above the top of a vehicle, and support structure means for so supporting said support frame above said vehicle, said support structure including bearing support cross-member means transversely disposed over the top of said vehicle and secured to said drain strips thereof, said cross-member means including a cross-member having upstanding ears, said support frame including longitudinal members having outwardly extending lower flanges, and guide means adjustably disposed through and directed inwardly with respect to said upstanding ears for constraining the movements of said longitudinal members and said lower flanges below said guide means.

2. Structure according to claim 1 wherein said ears are mutually spaced apart a distance greater than the width of said frame thereat, said bearing support cross-member supporting said support frame for slideable, nominally horizontal, longitudinal and transverse movements.

References Cited by the Examiner

UNITED STATES PATENTS

| 1,270,086 | 6/1918 | Wochner | 214—38.8 |
| 2,195,366 | 3/1940 | Haigh | 224—42.03 |
| 2,486,316 | 10/1949 | Morse | 214—450 |
| 2,573,187 | 10/1951 | Desilets | 224—42.03 |
| 2,682,694 | 7/1954 | Kempkes | 24—263 |
| 2,800,264 | 7/1957 | McFadyen | 224—42.08 |
| 2,887,237 | 5/1959 | Ellingson | 224—42.03 |
| 2,950,034 | 8/1960 | Osborn. | |
| 2,993,254 | 7/1961 | Larson | 24—263 |
| 3,100,241 | 8/1963 | Goldstein | 224—42.03 |
| 3,170,583 | 2/1965 | Meyer | 214—450 |

GERALD M. FORLENZA, *Primary Examiner.*

HUGO O. SCHULZ, *Examiner.*

A. GRANT, J. E. OLDS, *Assistant Examiners.*